(12) United States Patent
Lee et al.

(10) Patent No.: US 9,398,359 B2
(45) Date of Patent: Jul. 19, 2016

(54) DISPLAY DEVICE

(71) Applicant: Samsung Display Co., Ltd., Yongin (KR)

(72) Inventors: Tae Hee Lee, Gumi-si (KR); Jong Sung Bae, Hwaseong-si (KR); Jong Seo Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 112 days.

(21) Appl. No.: 14/285,985

(22) Filed: May 23, 2014

(65) Prior Publication Data

US 2015/0010187 A1    Jan. 8, 2015

(30) Foreign Application Priority Data

Jul. 4, 2013    (KR) .................. 10-2013-0078391

(51) Int. Cl.
*H04R 1/02*    (2006.01)
*G06F 3/043*   (2006.01)

(52) U.S. Cl.
CPC ............. *H04R 1/028* (2013.01); *G06F 3/043* (2013.01); *H04R 2499/15* (2013.01)

(58) Field of Classification Search
CPC ...... H04R 1/028; H04R 2499/15; H04R 5/02; H04R 2201/023; H04R 2499/11; H04R 1/1033

USPC .......................................................... 381/333
See application file for complete search history.

(56) References Cited

U.S. PATENT DOCUMENTS

| | | | | |
|---|---|---|---|---|
| 7,684,576 | B2* | 3/2010 | Bank | H04R 1/028 381/152 |
| 8,242,681 | B2* | 8/2012 | Tagawa | H01J 29/87 313/495 |
| 8,340,329 | B2* | 12/2012 | Ogura | H01Q 1/44 343/720 |
| 8,363,863 | B2 | 1/2013 | Andoh et al. | |
| 8,369,543 | B2 | 2/2013 | Suzuki et al. | |
| 8,503,700 | B2* | 8/2013 | Fujise | H04R 7/06 381/162 |
| 2014/0160040 | A1* | 6/2014 | Kang | H04R 17/005 345/173 |

* cited by examiner

*Primary Examiner* — Mark Blouin
(74) *Attorney, Agent, or Firm* — Cantor Colburn LLP

(57) ABSTRACT

A display device includes: a display panel which displays an image; a rear chassis which covers a rear surface of the display panel, where the rear chassis includes: a first protruding region which protrudes to a rear surface of the chassis; and a second protruding region which is disposed in the first protruding region and further protrudes from the first protruding region to the rear surface of the chassis; and an acoustic element disposed in the first protruding region and at a space defined in the second protruding region, where the acoustic element includes a plurality of electrodes, and a vibration material layer disposed between the electrodes.

19 Claims, 17 Drawing Sheets

28-1  28-2  27  28-3  28

DISPLAY DEVICE

This application claims priority to Korean Patent Application No. 10-2013-0078391, filed on Jul. 4, 2013, and all the benefits accruing therefrom under 35 U.S.C. §119, the content of which in its entirety is herein incorporated by reference.

BACKGROUND (a) Field

Exemplary embodiments of the invention relate to a display device, and more particularly, to a display device which generates a sound or vibrations.

(b) Description of the Related Art

Various types of flat display device, such as a liquid crystal display ("LCD"), a plasma display panel ("PDP"), an organic light emitting display ("OLED"), an electrowetting display ("EWD"), an electrophoretic display ("EPD"), an embedded micro cavity display ("EMD"), and a nano crystal display ("NCD"), have been developed from a cathode ray tube ("CRT") type display device including a conventional cathode ray tube.

Among the various types of flat panel display, the LCD, which has a thin thickness, light weight and low power consumption, is widely used in various information processing devices. In general, the LCD is a device which generates an electric field by applying different potentials to a pixel electrode and a common electrode in a state in which a liquid crystal material is disposed between an upper substrate on which the common electrode, a color filter, and the like, are provided and a lower substrate on which a thin film transistor, the pixel electrode, and the like, are provided to change an arrangement of liquid crystal molecules, and thus controls transmittance of light to display images.

The LCD typically includes a liquid crystal panel and a backlight unit for providing light to the liquid crystal panel from under the liquid crystal panel.

The OLED includes a light emitting diode ("LED") which emits light and does not include a backlight. In a conventional flat display device, a separate speaker may be included to provide a sound.

Further, when the conventional flat display device is used in a touch type display device, which is widely used, the touch type display device further includes a panel including a touch sensor or a touch sensor installed therein to sense a touch or an operation.

SUMMARY

Exemplary embodiments of the invention relate to a display device which generates a sound without including a separate speaker therein, or which senses a touch without including a separate touch panel/touch sensor.

In an exemplary embodiment of the invention, a display device includes: a display panel which displays an image; a rear chassis which covers a rear surface of the display panel, where the rear chassis includes: a first protruding region which protrudes to a rear surface of the chassis; and a second protruding region which is disposed in the first protruding region and further protrudes from the first protruding region to the rear surface of the chassis; and an acoustic element disposed in the first protruding region and at a space defined in the second protruding region, where the acoustic element includes a plurality of electrodes, and a vibration material layer disposed between the electrodes.

In an exemplary embodiment, the acoustic element may cover the second protruding region.

In an exemplary embodiment, the display device may further include an adhesive disposed along a boundary between the first protruding region and the second protruding region, where the adhesive fixes the acoustic element in a predetermined position corresponding to the first protruding region and the second protruding region.

In an exemplary embodiment, the acoustic element may be bonded to the rear surface of the display panel by the adhesive, and the adhesive may include a non-conductive epoxy.

In an exemplary embodiment, the display device may further include an additional acoustic element disposed inside the space defined in the second protruding region.

In an exemplary embodiment, the adhesive may be disposed between the additional acoustic element and an inner surface of the second protruding region along an edge portion of a rear surface of the additional acoustic element, and the additional acoustic element may be spaced apart from the inner surface of the second protruding region.

In an exemplary embodiment, each of the first protruding region and the second protruding region may include a plurality of portions, and the portions of the first protruding region and the portions of the second protruding region may be in a one-to-one correspondence with each other.

In an exemplary embodiment, each of the first protruding region and the second protruding region may include two portions, the acoustic element may be disposed in one of the two portions of the first protruding region and at a space defined in one of the two portions of the second protruding region corresponding to the one of the two portions of the first protruding region, the display device may further include an additional acoustic element disposed in the other of the two portions of the first protruding region and at a space defined in the other of the two portions of the second protruding region corresponding to the other of the two portions of the first protruding region.

In an exemplary embodiment, the display device may further include a wiring connection part defined in the rear chassis, and an acoustic signal line disposed in the wiring connection part and connected to the acoustic element.

In an exemplary embodiment, the acoustic element may further include an electrode pad which extends to an upper portion of the vibration material layer through a side of the vibration material layer from an electrode disposed under the vibration material layer.

In an exemplary embodiment, the acoustic element may include three vibration material layers, and four electrodes, the three vibration material layers may be disposed opposite to each other, and the four electrodes may be disposed at an outermost side of the three vibration material layers and between the three vibration material layers.

In an exemplary embodiment, the acoustic element may further include an electrode pad which extends from an electrode disposed at a bottom portion of the vibration material layers among the four electrodes to an upper portion of the vibration material layers through a side of the vibration material layers.

In an exemplary embodiment, two of the four electrodes each may be electrically connected to each other and alternately disposed with each other.

In an exemplary embodiment, the display device may further include: an amplifier which amplifies an acoustic signal applied from an outside; and an acoustic signal line which transfers the acoustic signal from the amplifier to the acoustic element.

In an exemplary embodiment, the display panel may include a substrate, a printed circuit board ("PCB") and a flexible circuit board, where a substrate of the display panel may be connected to the PCB through the flexible circuit board, and the amplifier may be disposed on the PCB.

In an exemplary embodiment, the vibration material layer of the acoustic element may vibrates at a frequency outside an audible frequency range, and a haptic function of the display device may sense a change in the frequency of a vibration of the acoustic element based on a touch of a user.

In an exemplary embodiment, the acoustic element may sense a pressure thereon using a voltage generated therein by the pressure.

In an exemplary embodiment, the display device may further include a microphone, the acoustic element may vibrates at a frequency outside an audible frequency range to emit a sound pressure, and the microphone may sense an operation of a user by sensing a change in the sound pressure by the operation of the user based on a Doppler effect.

In an exemplary embodiment, the display device may further include: a battery which supplies power to the display device, where the acoustic element generates a voltage when the acoustic element is vibrated, and the acoustic element transfers the generated voltage to the battery to charge the battery.

According to the exemplary embodiments described herein, the display device may provide a sound from an acoustic element including a piezo material, for example, materials such as poly vinylidene fluoride ("PVDF") and lead-zirconate-titanate ("PZT"), by applying an electric field to the acoustic element. In such embodiments, the display device may sense a touch thereon using the acoustic element that generates a voltage when being vibrated by the touch. In such embodiment, the display device may detect an operation of a user by sensing a change in the sound pressure from the acoustic element by the operation of the user based on a Doppler effect.

BRIEF DESCRIPTION OF THE DRAWINGS

The above and other features of the invention will become more apparent by describing in detail exemplary embodiments thereof with reference to the attached drawings, in which.

DETAILED DESCRIPTION OF THE EMBODIMENTS

Figure 1:
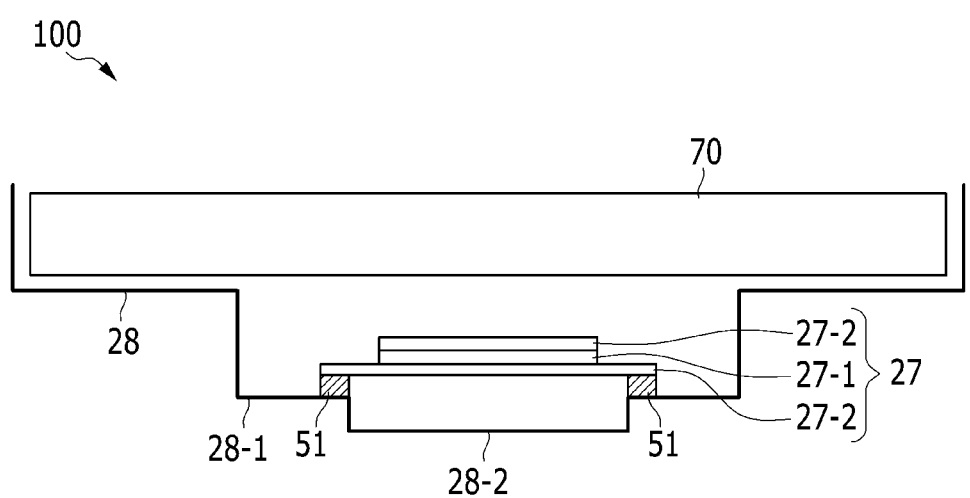
FIG. 1 is a cross-sectional view of an exemplary embodiment of a display device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an exemplary embodiment of a display device according to the invention will be described in detail with reference to FIGS. 1 and 2.

Figure 2:
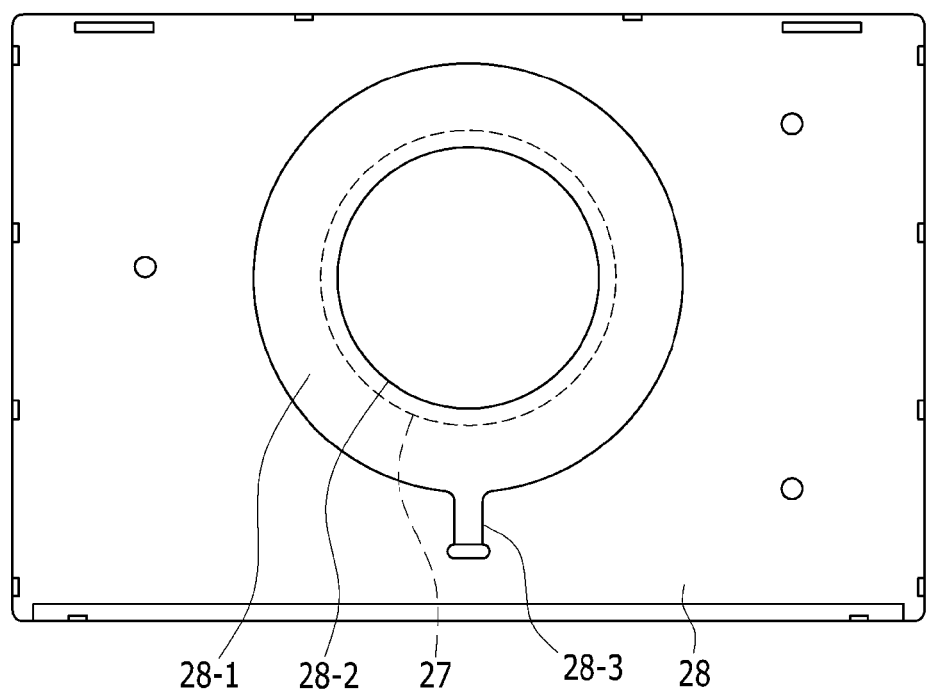
FIG. 2 is a rear view of an exemplary embodiment of the display device according to the invention.

FIG. 1 is a cross-sectional view of an exemplary embodiment of a display device according to the invention, and FIG. 2 is a rear view of an exemplary embodiment of the display device according to the invention.

An exemplary embodiment of the display device 100 according to the invention includes a display panel 70, a rear chassis 28 which receives the display panel 70, protects a rear surface of the display panel 70, and has protruding regions, e.g., a first protruding region 28-1 and a second protruding region 28-2, and an acoustic element 27 which are disposed in a space defined by the protruding regions 28-1 and 28-2. In such an embodiment, the second protruding region 28-2 may improve acoustic characteristics emitted from the acoustic element 27.

According to an exemplary embodiment, as shown in FIG. 1, the display panel 70 may be a display panel which emits light therefrom or a light receiving type display panel which displays images by receiving light from a light source. In an exemplary embodiment, where the display panel 70 is the display panel which emits light therefrom, the display panel 70 may be an organic light emitting panel, for example. In an alternative exemplary embodiment, where the display panel 70 is a light receiving type display panel, the display panel 70 may be a liquid crystal panel, for example. In such an embodiment, where the display panel 70 is the light receiving type display panel, the display device 100 may further include a backlight unit.

In an exemplary embodiment, the display panel 70 includes a thin film transistor ("TFT") substrate including a plurality of TFTs. In such an embodiment, the TFT substrate may be a transparent insulating substrate including the TFTs arranged substantially in a matrix form, in which a source terminal of a TFT is connected to a data line, a gate terminal of the TFT is connected to a gate line, and a drain terminal of the TFT is connected to a pixel electrode including a conductive transparent material such as indium tin oxide ("ITO"), for example. The detailed structure of the display panel 70 may be variously modified, based on the type thereof.

In an exemplary embodiment, as shown in FIG. 1, the display panel 70 may be a display panel assembly. In such an embodiment, the display panel 70 is an assembly including a display panel, an integrated circuit ("IC") chip, a flexible circuit board (e.g., flexible printed circuit board ("FPCB")), and a driving unit for driving the display panel.

In such an embodiment, the data line and the gate line of the display panel 70 are connected to the flexible circuit board to receive an electrical signal from the flexible circuit board, and a source terminal and a gate terminal of the TFT are applied with the electrical signal such that the TFT is turned on/off based on a scanning signal applied to the gate terminal through the gate line to transfer or block an image signal applied to the source terminal to or from the drain terminal through the data line. The flexible circuit board receives the image signal from the outside of the display panel, and applies driving signals generated based on the image signal to the data line and the gate line of the display panel, respectively.

In such an embodiment, the flexible circuit board generates the image signal, which is a signal for driving the display device 100, the scanning signal, and a plurality of timing signals for applying the image signal and the scanning signal at a predetermined time, and applies the image signal and the scanning signal to the gate line and the data line of the display panel 70, respectively. In an exemplary embodiment, the flexible circuit board may include an amplifier which amplifies and transfers an acoustic signal (see FIG. 6 or 11). In such an embodiment, the amplifier receives and amplifies the acoustic signal transferred from the outside, and transfers the acoustic signal to the acoustic element 27 through an acoustic signal wire.

In an exemplary embodiment, the display panel 70 may further include a mold frame and may be maintained at a predetermined position with respect to the rear chassis 28, e.g., fixed to the rear chassis 28, by the mold frame. In an exemplary embodiment, the display panel 70 may further include a top chassis to prevent the display panel 70 from moving out of the predetermined position with respect to the rear chassis 28.

In an exemplary embodiment, the display device 100 includes the rear chassis 28. The rear chassis 28 may be referred to as a bottom chassis, a back chassis, or the like. In an exemplary embodiment, the rear chassis 28 is disposed on the rear surface of the display panel 70 such that the rear chassis 28 receives and protects the display panel 70. According to an exemplary embodiment of the invention, the rear chassis 28 may be coupled with the mold frame or the top chassis of the display panel 70 to enclose the display panel 70 such that the display panel 70 is effectively prevented from being damaged from the outside, e.g., protected from an external impact or moisture.

In an exemplary embodiment, the rear chassis 28 includes the protruding regions 28-1 and 28-2 which protrude in a rear direction. Herein, the rear direction is defined as a direction from an internal surface of the rear chassis 28 that faces the display panel 70 to an external surface of the rear chassis 28 opposite to the internal surface. In FIG. 1, the protruding degree and width of the protruding regions 28-1 and 28-2 are enlarged, and the real protruding degree may be substantially low such that the real protruding degree may not to be visible with naked human eyes.

In one exemplary embodiment, for example, the first protruding region 28-1 circularly protrudes at a portion of the rear chassis 28, and the second protruding region 28-2 has a structure which further circularly protrudes within the first protruding region 28-1, as shown in FIG. 2, but the invention is not limited thereto. In an alternative exemplary embodiment of the invention, the protruding shape and degree of the protruding regions 28-1 and 28-2 may be variously modified.

In an exemplary embodiment, the acoustic element 27 is disposed inside a space defined by the first and second protruding region 28-1 and 28-2. In one exemplary embodiment, for example, the acoustic element 27 is disposed inside a space defined by the first protruding region 28-1 at a space defined in the second protruding region 28-2. In an exemplary embodiment, as shown in FIGS. 1 and 2, the acoustic element 27 has a circular structure and has a diameter larger than a diameter of the second protruding region 28-2. In an exemplary embodiment, the acoustic element 27 may be bonded to the first protruding region 28-1 by an adhesive 51 and is disposed covering the second protruding region 28-2. In an exemplary embodiment, as shown in FIG. 2, the acoustic element 27 covers the second protruding region 28-2, and the region occupied by the acoustic element 27 includes a region occupied by the second protruding region 28-2. The adhesive 51 may be disposed in the first protruding region 28-1 along a boundary between the first protruding region 28-1 and the second protruding region 28-2, and the acoustic element 27 is bonded to the first protruding region 28-1 by the adhesive 51. The adhesive 51 may include an adhesive material including a non-conductive epoxy. In an exemplary embodiment, in a process of bonding the acoustic element 27, the adhesive 51 may be heated or naturally dried to dry the adhesive 51. In an exemplary embodiment, where heat is applied to the acoustic element 27, characteristics of a vibration material layer 27-1 may deteriorate. Therefore, in an exemplary embodiment, at the time of bonding the acoustic element 27, the adhesive 51 may be naturally dried for a relatively long period of time. In an alternative exemplary embodiment, where the acoustic element 27 functions as a device that effectively operates with low sound quality, such as a receiver providing the opponent voice from a phone, for example, the adhesive 51 may be dried by heat.

According to an exemplary embodiment of the invention, at least a portion of the second protruding region 28-2 is exposed by the acoustic element 27, such that the first protruding region 28-1 and the second protruding region 28-2 may communicate with each other.

Figure 3:
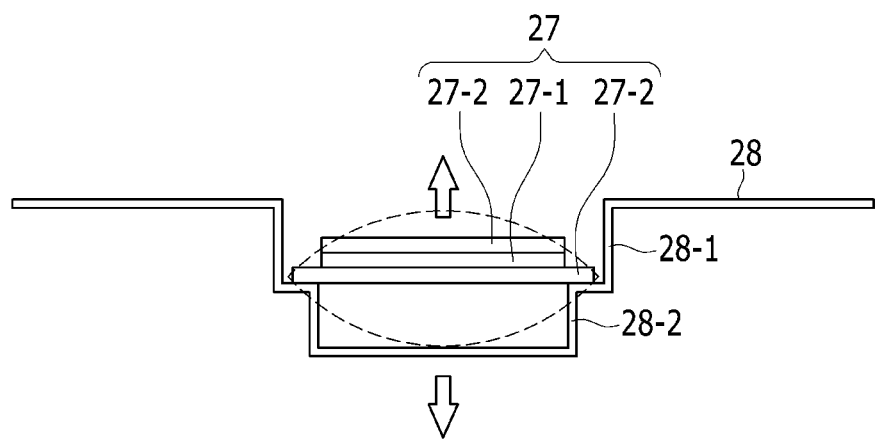
FIG. 3 is a diagram illustrating operation characteristics of an exemplary embodiment of an acoustic element in the display device according to the invention.
Figure 3:
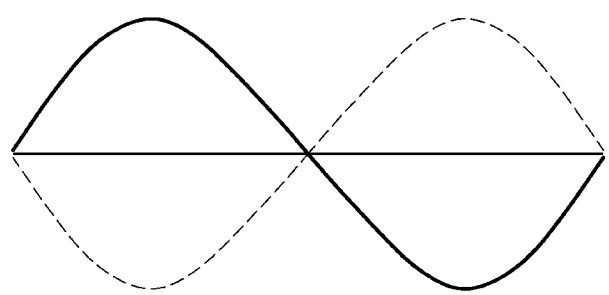

In an exemplary embodiment, the first protruding region 28-1 and the second protruding region 28-2 function as a sound box which amplifies the sound provided from the acoustic element 27. In such an embodiment, in addition to the first protruding region 28-1 that functions as the sound box, the second protruding region 28-2 is additionally provided to allow the acoustic element 27 to vibrate in upper and lower directions as illustrated in FIG. 3, thereby improving acoustic characteristics. Operations of the first and second protruding regions 28-1 and 28-2 will be described later in greater detail with reference to FIG. 3.

In one exemplary embodiment, for example, the acoustic element 27 includes a plurality of electrodes 27-2 and the vibration material layer 27-1 disposed therebetween. In an exemplary embodiment, the electrodes 27-2 may be two opposing electrodes. The vibration material layer 27-1 includes a piezo material which vibrates by the electric field applied from the electrodes 27-2 disposed on and beneath the vibration material layer 27-1. In such an embodiment, the piezo material may include poly vinylidene fluoride ("PVDF"), lead-zirconate-titanate ("PZT") ceramic, or the like, for example.

In such an embodiment, the PVDF may include polyvinylidene fluoride trifluoroethylene ("PVDF-TrFE") and may have material characteristics which may be efficiently provided in a flexible film type. The PZT may not be efficiently manufactured in a film type and have flexible characteristics, compared to the PVDF. However, according to an exemplary embodiment of the invention, a mixture of the PZT and the PVDF (or PVDF-TrFE) may be used to provide the vibration material layer 27-1 in a film type.

In an exemplary embodiment, the electrodes 27-2 are disposed at both sides of the vibration material layer 27-1, respectively, and apply an electric field to the vibration material layer 27-1. The electrodes 27-2 may include a conductive material. In an exemplary embodiment, the electrodes 27-2 may include a transparent conductive material such as ITO and indium zinc oxide ("IZO"), opaque metals, conductive polymer, and carbon nanotube ("CNT"), for example.

Referring to FIG. 2, in an exemplary embodiment, the first protruding region 28-1 has a circular structure and an end portion of the circular structure extends substantially linearly in a direction, and the extended end portion of the circular structure defines a wiring connection part 28-3. The acoustic signal line for transferring the acoustic signal transferred from the amplifier to the acoustic element 27 is connected to the protruding wiring connection part 28-3. The wiring connection part 28-3 may protrude at a degree substantially the same as a protruding degree of the first protruding region 28-1. In an alternative exemplary embodiment, the protruding degree of the wiring connection part 28-3 may be less than the protruding degree of the first protruding region 28-1.

In an exemplary embodiment of the invention, a window including tampered glass or plastic may be disposed on the front surface of the display panel 70. The window effectively prevents the front surface of the display panel 70 from being damaged from the outside. The window may configure an outer surface of a display for a portable electronic device such as a portable phone or other electronic devices In an exemplary embodiment, as shown in FIG. 1, the display device 100 may include a single acoustic element 27, but the invention is not limited thereto. In an alternative exemplary embodiment, more than two acoustic elements 27 may be included in the display device 100.

Hereinafter, the acoustic characteristics by the first and second protruding regions 28-1 and 28-2 will be described with reference to FIG. 3.

FIG. 3 is a diagram illustrating operation characteristics of an exemplary embodiment of the acoustic element in the display device according to the invention.

In an exemplary embodiment, when the acoustic signal is applied, the acoustic element 27 vibrates by being bonded to an inner surface of the first protruding region 28-1 of the rear chassis 28. The sound generated by the vibration of the acoustic element 27 is amplified within the first and second protruding regions 28-1 and 28-2 and is emitted to the outside. In such an embodiment, a contact area between the acoustic element 27 and the first protruding region 28-1 is not substantially great, the amount of vibration transferred to the rear chassis 28 through the first protruding region 28-1 is not substantially great. In such an embodiment, referring to an arrow of FIG. 3, the acoustic element 27 is fixed to the rear chassis 28 in a circular shape by the adhesive 51, such that a center of the acoustic element 27 substantially vertically vibrates when the acoustic element 27 vertically vibrates in a thickness direction thereof by the acoustic signal.

If substantially an entire portion of the rear surface of the acoustic element 27 is bonded to the rear chassis 28 by the adhesive 51, the vibration of the acoustic element 27 is transferred to the display device through the rear chassis 28, and the vibration of the acoustic element 27 toward the rear chassis 28 is blocked due to the rear chassis 28. If substantially an entire portion of the rear surface of the acoustic element 27 is bonded to the rear chassis 28, when the acoustic element 27 vertically vibrates in a waveform as illustrated in a lower portion of FIG. 3, the acoustic element 27 vibrates only upward but does not vibrate downward, only a portion of the waveform normally transfers a sound and a portion thereof may be lost, such that the acoustic characteristics may deteriorate.

In an exemplary embodiment of the invention, when only a side portion of the rear surface of the acoustic element 27 is fixed by the adhesive 51, such that the acoustic element 27 may substantially vertically vibrate, and the loss and deformation of the waveform of a sound wave may not occur. Accordingly, in such an embodiment, the sound may be transferred without loss.

According to an exemplary embodiment of the invention, a hole may be defined on a portion of the rear chassis 28 to efficiently emit the sound generated from the acoustic element 27 to the outside. In an exemplary embodiment, the hole is opened to directly transfer a sound to the outside. In an alternative exemplary embodiment, the hole may be filled with materials, such as a sponge material used for a speaker, and the like, to allow a sound to pass through the sponge and then be transferred to the outside.

Hereinafter, an alternative exemplary embodiment of the invention will be described with reference to FIG. 4.

Figure 4:
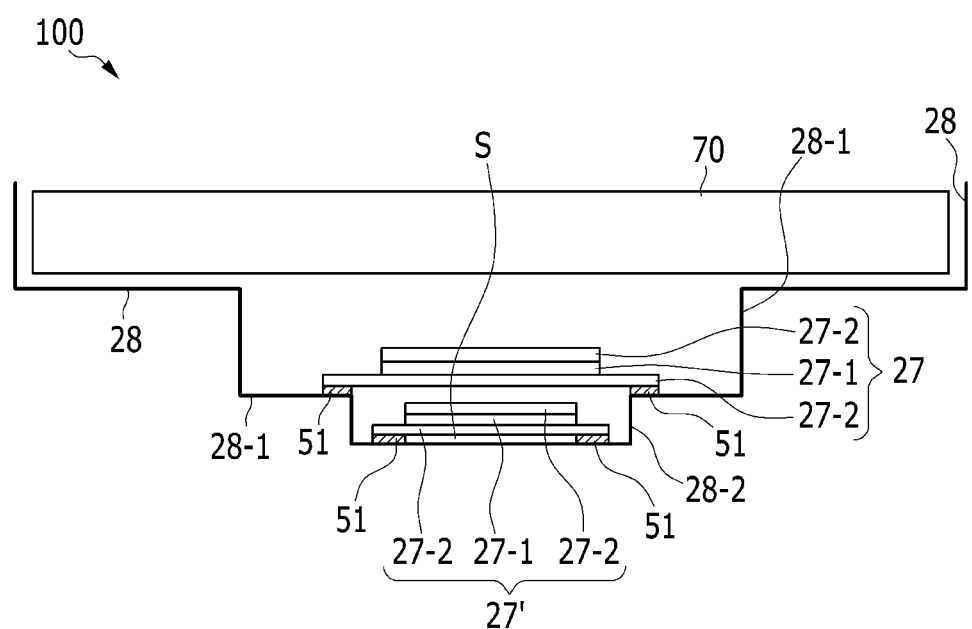
FIG. 4 is a cross-sectional view of an alternative exemplary embodiment of the display device according to the invention.

FIG. 4 is a cross-sectional view of an alternative exemplary embodiment of the display device according to the invention.

The display device in FIG. 4 is substantially the same as the display device shown in FIG. 1 except for an additional acoustic element 27' bonded to an inner side of the second protruding region 28-2. The same or like elements shown in FIG. 4 have been labeled with the same reference characters as used above to describe the exemplary embodiments of the display device shown in FIG. 1.

In an exemplary embodiment, as shown in FIG. 4, only a portion of the additional acoustic element 27' is bonded to the inner side of the second protruding region 28-2 by the adhesive 51, and the rear surface of the acoustic element 27' is spaced apart from the second protruding region 28-2 with the adhesive 51 disposed therebetween. In such an embodiment, a space S is disposed between the additional acoustic element 27' and the second protruding region 28-2. The additional acoustic element 27' may vibrate downward in the space S.

The exemplary embodiment of FIG. 4 will hereinafter be described in greater detail.

In such an embodiment, the display device includes the display panel 70, the rear chassis 28 which receives the display panel 70, protects the rear surface of the display panel 70, and has the protruding regions 28-1 and 28-2, and two acoustic elements, e.g., a first acoustic element 27 and a second acoustic element 27', which are disposed in a space defined by the inner sides of the first protruding region 28-1 and the second protruding region 28-2. In such an embodiment, the second protruding region 28-2 improves the acoustic characteristics emitted from the first acoustic element 27 which is disposed in the first protruding region 28-1.

In such an embodiment, the second acoustic element 27' which is disposed on the rear surface of the second protruding region 28-2 uses the first and second protruding regions 28-1 and 28-2 as a sound box thereof.

According to an exemplary embodiment, as shown in FIG. 4, the display panel 70 may a display panel which emits light therefrom or a light receiving type display panel which displays images by receiving light from a light source. In an exemplary embodiment, where the display panel 70 is the display panel which emits light therefrom, the display panel 70 may be an organic light emitting panel, for example. In an alternative exemplary embodiment, where the display panel 70 is a light receiving type display panel, the display panel 70 may be a liquid crystal panel, for example. In such an embodiment, where the display panel 70 is the light receiving type display panel, the display device 100 may further include a backlight unit.

In an exemplary embodiment, the display panel 70 includes a TFT substrate including a plurality of TFTs. In such an embodiment, the TFT substrate may be a transparent insulating substrate including the TFTs arranged substantially in a matrix form, in which a source terminal of a TFT is connected to a data line, a gate terminal of the TFT is connected to a gate line, and a drain terminal of the TFT is connected to a pixel electrode including a transparent conductive material such as ITO, for example. The detailed structure of the display panel 70 may be variously modified, based on the type thereof.

In an exemplary embodiment, as shown in FIG. 4, the display panel 70 may be a display panel assembly. In such an embodiment, the display panel 70 is an assembly including a display panel, an IC chip, a flexible circuit board (e.g., FPCB), and a driving unit for driving the display panel.

In such an embodiment, when the data line and the gate line of the display panel 70 are connected to the flexible circuit board to receive an electrical signal from the flexible circuit board, and a source terminal and a gate terminal of the TFT are applied with the electrical signal such that the TFT is turned on/off based on a scanning signal applied to the gate terminal through the gate line to transfer or block an image signal applied to the source terminal to or from the drain terminal through the data line. The flexible circuit board receives the image signal from the outside of the display panel, and applies driving signals generated based on the image signal to the data line and the gate line of the display panel, respectively.

In such an embodiment, the flexible circuit board generates the image signal which is a signal for driving the display device 100, the scanning signal, and a plurality of timing signals for applying the image signal and the scanning signal at a predetermined time, and applies the image signal and the scanning signal to the gate line and the data line of the display panel 70, respectively. In an exemplary embodiment, the flexible circuit board may also include an amplifier which amplifies and transfers an acoustic signal (see FIG. 11). In such an embodiment, the amplifier receives and amplifies the acoustic signal transferred from the outside and transfers the acoustic signal to the acoustic element 27 through an acoustic signal line.

In an exemplary embodiment, the display panel 70 may further include a mold frame and may be maintained at a predetermined position with respect to the rear chassis 28, e.g., fixed to the rear chassis 28, by the mold frame. In an exemplary embodiment, the display panel 70 may further include a top chassis to prevent the display panel 70 from moving out of the predetermined position with respect to the rear chassis 28.

In an exemplary embodiment, display device 100 includes the rear chassis 28. The rear chassis 28 may be referred to as a bottom chassis, a back chassis, or the like. In an exemplary embodiment, the rear chassis 28 is disposed on the rear surface of the display panel 70 such that the rear chassis 28 receives and protects the display panel 70. According to an exemplary embodiment of the invention, the rear chassis 28 may be coupled with the mold frame or the top chassis of the display panel 70 to enclose the display panel 70 such that the display panel 70 is effectively prevented from being damaged from the outside, e.g., protected from an external impact or moisture.

In an exemplary embodiment, the rear chassis 28 includes the protruding regions 28-1 and 28-2 which protrude in a rear direction. Herein, the rear direction is defined as a direction from an internal surface of the rear chassis 28 that faces the display panel 70 to an external surface of the rear chassis 28 opposite to the internal surface. In FIG. 1, the protruding degree and width of the protruding regions 28-1 and 28-2 are enlarged, and the real protruding degree may be substantially low such that the real protruding degree may not to be easily visible with the naked human eyes.

In one exemplary embodiment, for example, the first protruding region 28-1 circularly protrudes at a portion of the rear chassis 28 and the second protruding region 28-2 has a structure which further circularly protrudes circularly within the first protruding region 28-1, as shown in FIG. 2, but the invention is not limited thereto. In an alternative exemplary embodiment of the invention, the protruding shape and degree of the protruding regions 28-1 and 28-2 may be variously modified.

In an exemplary embodiment, the first acoustic element 27 is disposed inside a space defined by the first and second protruding region 28-1 and 28-2. In one exemplary embodiment, for example, the acoustic element 27 is disposed inside a space defined by the first protruding region 28-1 at the space defined in the second protruding region 28-2, and the second acoustic element 27' is disposed at the inner side of the second protruding region 28-2. In an exemplary embodiment, the acoustic elements 27 and 27' have a circular structure, in which the first acoustic element 27 has a diameter larger than a diameter of the second protruding region 28-2, and the second acoustic element 27' has a diameter smaller than the diameter of the second protruding region 28-2. In such an embodiment, the first acoustic element 27 having a diameter larger than the diameter of the second protruding region 28-2 is disposed within the first protruding region 28-1, and the second acoustic element 27' having a diameter smaller than the diameter of the second protruding region 28-2 is disposed at the inner side of the second protruding region 28-2. The two acoustic elements 27 and 27' are bonded to the first and second protruding region 28-1 and 28-2, respectively, by the adhesive 51. The first acoustic element 27 is bonded to the first protruding region 28-1 by the adhesive 51 and is disposed to have a structure covering the second protruding region 28-2. In an exemplary embodiment, a portion of the rear surface of the second acoustic element 27' is fixed by the adhesive 51, and thus the second acoustic element 27' is bonded to the inner side of the second protruding region 28-2. In a process of bonding the second acoustic element 27', the adhesive 51 is provided along an edge portion of the rear surface of the second acoustic element 27' and the second acoustic element 27' may be bonded with a space S provided between the second acoustic element 27' and the second protruding region 28-2. In such an embodiment, the space S allows the second acoustic element 27' to vibrate downward and may also function as the sound box of the second acoustic element 27'.

The adhesive 51 bonding the acoustic elements 27 and 27' may include an adhesive material including a non-conductive epoxy. In an exemplary embodiment, in a process of bonding the acoustic elements 27 and 27', the adhesive 51 may be heated or naturally dried to dry the adhesive 51. In an exemplary embodiment, where heat is applied to the acoustic element 27, characteristics of a vibration material layer 27-1 may deteriorate. Therefore, in an exemplary embodiment, at the time of bonding the acoustic element 27, the adhesive may be naturally dried for a relatively long period of time. In an alternative exemplary embodiment, where the acoustic element 27 functions as a device that effectively operates with low sound quality, such as a receiver providing the opponent voice from a phone, for example, the adhesive 51 may be dried by heat.

According to an exemplary embodiment of the invention, at least a portion of the space defined in the second protruding region 28-2 exposed by the first acoustic element 27, such that the first protruding region 28-1 and the second protruding region 28-2 may communicate with each other.

In an exemplary embodiment, the first protruding region 28-1 and the second protruding region 28-2 function as the sound box which amplifies the sound provided from the acoustic elements 27 and 27'. In such an embodiment, in addition to the first protruding region 28-1 that functions as the sound box, the second protruding region 28-2 is additionally provided to allow the acoustic element 27 to vibrate in upper and lower directions as illustrated in FIG. 3, thereby improving acoustic characteristics.

In an exemplary embodiment, each of the acoustic elements 27 and 27' include the electrodes 27-2 and the vibration material layer 27-1 disposed between the electrodes 27-2. The vibration material layer 27-1 includes a piezo material which vibrates by the electric field applied from the electrodes 27-2 disposed on and beneath the vibration material layer 27-1. In such an embodiment, the piezo material may include PVDF, PZT ceramic, or the like, for example.

In such an embodiment, the PVDF includes PVDF-TrFE and may have material characteristics which may be efficiently provided in a flexible film type. The PZT may not be efficiently manufactured in a film type and have flexible characteristics, compared to the PVDF. However, according to an exemplary embodiment of the invention, a mixture of the PZT and the PVDF (or PVDF-TrFE) may be used to provide the vibration material layer 27-1 in a film type.

In an exemplary embodiment, the electrodes 27-2 are disposed at both sides of the vibration material layer 27-1, respectively and apply an electric field to the vibration material layer 27-1. The electrodes 27-2 may include a transparent conductive material such as ITO and IZO, opaque metals, conductive polymer, and CNT, for example.

According to an exemplary embodiment of the invention, a window including tampered glass or plastic may be disposed on the front surface of the display panel 70. The window effectively prevents the front surface of the display panel 70 from being damaged from the outside. The window may configure an outer surface of a display for a portable electronic device such as a portable phone or other electronic devices.

In an exemplary embodiment, as shown in FIGS. 1 and 4, the first and second protruding regions 28-1 and 28-2 each have a circular structure but the invention is not limited thereto. In an alternative exemplary embodiment, the shape and number of portions of first and second protruding regions 28-1 and 28-2 may be variously modified, and various shapes of alternative exemplary embodiments of the first and second protruding regions 28-1 and 28-2 will be described with reference to FIG. 5.

Figure 5:
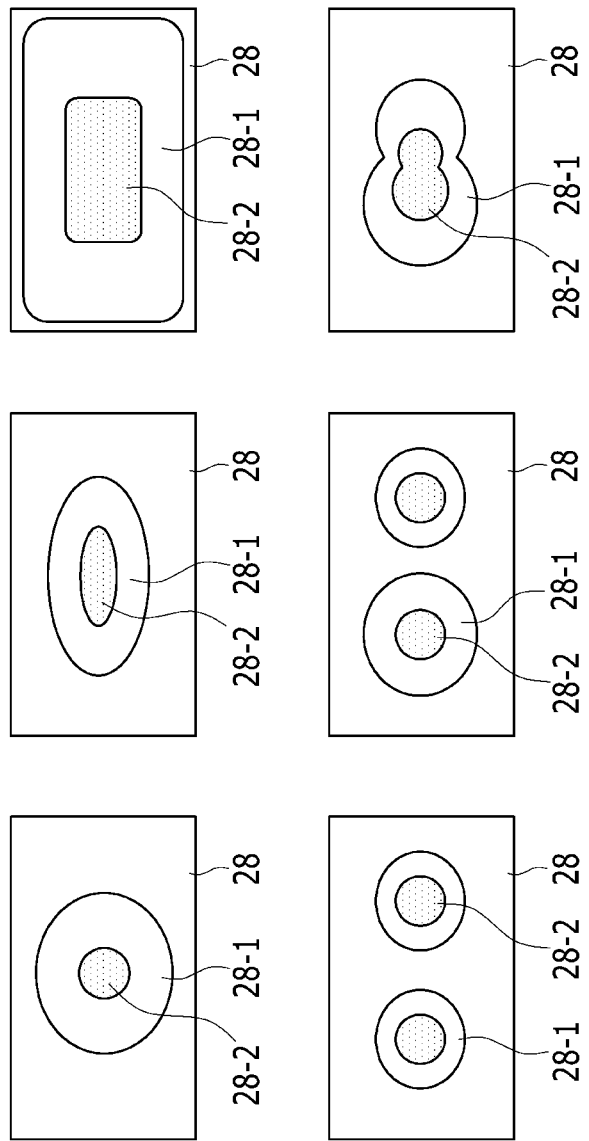
FIG. 5 is a rear view of various alternative exemplary embodiments of the display device according to the invention.

FIG. 5 is a rear view of alternative exemplary embodiments of the display device according to the invention.

First, FIG. 5 illustrates various exemplary embodiments of the protruding regions 28-1 and 28-2 in the rear chassis 28.

FIG. 5 illustrates various shapes of the protruding region 28-1. FIG. 5 schematically illustrates the first protruding region 28-1 and the second protruding region 28-2 defined on the rear chassis 28. In FIG. 5, the wiring connection part 28-3 which may be provided in the rear chassis 28 as illustrated in FIG. 2 is omitted for convenience of illustration.

The rear surface of the first protruding region 28-1 may have various shapes, such as a circular shape, an oval shape, or a quadrangular shape having a rounded corner. In an alternative exemplary embodiment, the rear surface of the first protruding region 28-1 may have a quadrangular shape having an angled corner, a polygonal shape having a rounded corner, or a polygonal shape having an angled corner, for example.

The second protruding region 28-2 is defined within the first protruding region 28-1 to have a shape corresponding to the shape of the first protruding region 28-1.

The acoustic element 27 is disposed to cover the second protruding region 28-2 with a diameter larger than the diameter of the second protruding region 28-2. In an exemplary embodiment, a single acoustic element 27 may be disposed within the protruding region 28-1, but the invention is not limited thereto. In an alternative exemplary embodiment, more than two acoustic elements 27 may be provided as illustrated in FIG. 4. In an exemplary embodiment, where the single acoustic element 27 is disposed, the acoustic element 27 may be disposed at the center of the protruding region 28-1.

FIG. 5 illustrates an exemplary embodiment in which the two first protruding region 28-1 include two portions having the same size, and the two portions of the two first protruding region 28-1 are defined on the rear chassis 28 at a predetermined interval, and FIG. 5 also illustrates an exemplary embodiment in which the first protruding region 28-1 include two portions having different sizes. In such embodiments, the portions of first protruding region 28-1 are disposed to correspond to portions of the second protruding region 28-2, respectively, and the acoustic element 27 is disposed in each portion of the first protruding region 28-2 to cover corresponding portion of the second protruding region 28-2. In such an embodiment, more than two acoustic elements 27 may be disposed.

Further, FIG. 5 illustrates an exemplary embodiment where the first protruding region 28-1 including two portions that overlap each other. In such an embodiment, the two portions of first protruding region 28-1 may have different circular shapes from each other, and the two portions of first protruding region 28-1 are arranged to overlap each other, thereby defining a single first protrude region 28-1. The first protruding region 28-1 is coupled to the second protruding region 28-2 having substantially the same shape and smaller size, and the acoustic element 27 that covers the second protruding region 28-2 may be disposed in the first protruding region 28-1. In such an embodiment, the two acoustic elements 27 may be disposed in the first protruding region 28-1 to cover the second protruding region 28-2. In an exemplary embodiment, as shown in FIG. 4, an additional acoustic element (e.g., the second acoustic element) 27' may be disposed in the second protruding region 28-2. In an exemplary embodiment, where two acoustic elements 27 and 27' are disposed in the protruding regions 28-1 and 28-2, each of which are virtually divided into the two circular protruding regions, the two acoustic elements 27 and 27' may each be disposed at a center of each circular protruding regions.

The shapes of some exemplary embodiments of the protruding regions 28-1 and 28-2 are illustrated in FIG. 5, but the invention is not limited thereto. According to an alternative exemplary embodiment of the invention, the shape of the first protruding region 28-1 and the shape of the second protruding region 28-2 may be different from each other.

Hereinafter, a structure in which the acoustic element 27 is connected to an acoustic signal line 80-1 will be described with reference to FIG. 6.

Figure 6:
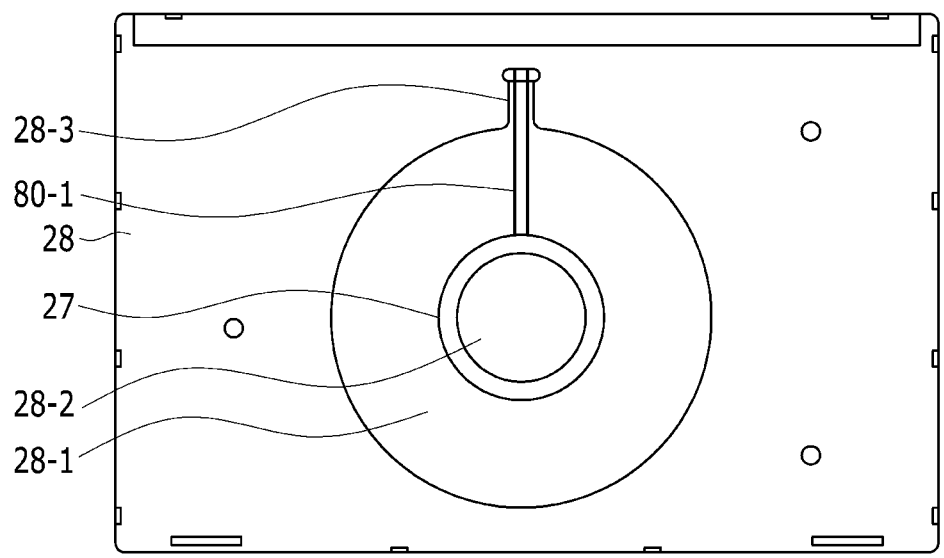
FIG. 6 is a diagram illustrating an exemplary embodiment of a wiring structure for connecting acoustic elements in the display device according to the invention.

FIG. 6 is a diagram illustrating an exemplary embodiment of a wiring structure that connects acoustic elements in the display device according to the invention.

In an exemplary embodiment of the display device 100 according to the invention, the acoustic signal line 80-1 is connected to the acoustic element 27 to apply the acoustic signal to the acoustic element 27. In such an embodiment, the acoustic signal line 80-1 may be connected to the acoustic element 27 in various ways. In an exemplary embodiment, where the rear chassis 28 has the protruding regions 28-1 and 28-2, as illustrated in FIG. 6, the wiring connection part 28-3 protrudes from the first protruding region 28-1 and is connected to the first protruding region 28-1. In an exemplary embodiment, the wiring connection part 28-3 may protrude at the same degree as the first protruding region 28-1, and the protruding degree of the wiring connection part 28-3 may be smaller than the first protruding region 28-1. Therefore, the acoustic signal line 80-1 extend to the first protruding region 28-1 through the wiring connection part 28-3 to be connected to the acoustic element 27 disposed within the first protruding region 28-1. According to an exemplary embodiment of the invention, where the wiring connection part 28-3 may not be provided, the acoustic signal line 80-1 may extend into the first protruding region 28-1 along the inner surface of the rear chassis 28.

Hereinafter, a modified example of the acoustic element 27 will be described with reference to FIGS. 7 to 10.

FIGS. 7 to 10 are diagrams illustrating structures of various alternative exemplary embodiments of the acoustic element according to the invention.

First, an exemplary embodiment of the acoustic element 27 shown in FIG. 7 will be described.

Figure 7:
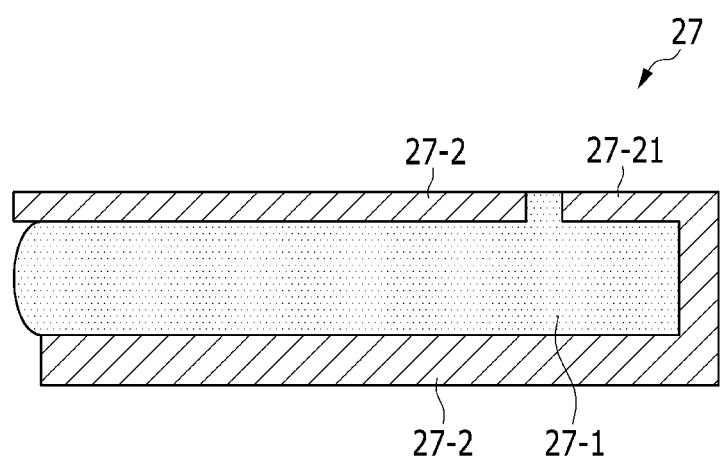
FIGS. 7 to 10 are diagrams illustrating structures of various alternative exemplary embodiments of the acoustic element according to the invention.

FIG. 7 illustrates a cross-section of a portion of the acoustic element 27, in which the acoustic element 27 includes two electrodes 27-2 and the vibration material layer 27-1 disposed between the two electrodes 27-2. In such an embodiment, the vibration material layer 27-1 includes a piezo material which vibrates by the electric field applied from the pair of electrodes 27-2 disposed on and beneath of the vibration material layer 27-1. In one exemplary embodiment, for example, the piezo material may include PVDF, PZT ceramic, or the like.

In an exemplary embodiment, one of the two electrodes 27-2 is disposed on the vibration material layer 27-1 (hereinafter, an upper electrode), and the other of the two electrodes 27-2 is disposed beneath the vibration material layer 27-1 (hereinafter, a lower electrode). In such an embodiment, as shown in FIG. 7, a portion of the lower electrode may extend along a side surface of the vibration material layer 27-1 to an upper surface of the vibration material layer 27-1. The portion of the lower electrode disposed on the vibration material layer 27-1 may function as an electrode pad 27-21. The wiring is connected to the two electrodes 27-2 to apply the electric field to the vibration material layer 27-1 and when the electrode pad 27-21 of the lower electrode 27-2 is disposed on the upper portion as illustrated in FIG. 7, the wiring may be directly connected to the two electrodes on the vibration material layer 27-1. In an exemplary embodiment, where the lower portion of the acoustic element 27 is bonded by the adhesive, and the like, the acoustic element may be applied with the signal through the upper portion of the vibration material layer 27-1.

Figure 8:
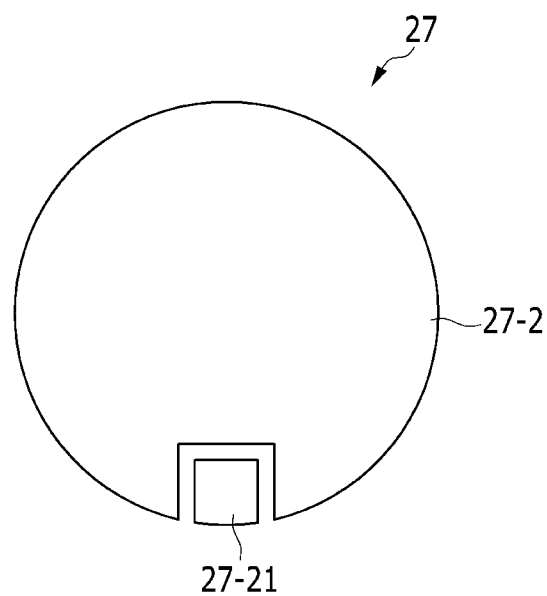

FIG. 8 is a top plan view of the acoustic element 27 shown in FIG. 7. The two electrodes 27-2 are disposed on the acoustic element 27, but the upper electrode 27-2 disposed on the acoustic element 27 occupies most of the upper surface of the acoustic element 27, the electrode pad 27-21 of the lower electrode 27-2 is disposed only in a portion of the upper surface of the acoustic element 27, and the electrode pad 27-21 is spaced apart from the upper electrode 27-2 at a predetermined interval. According to an exemplary embodiment, as shown in FIG. 8, the electrode pad 27-21 has a substantially quadrangular structure, and the upper electrode 27-2 has a substantially circular shape, excluding the portion corresponding to the electrode pad 27-21. In such an embodiment, the vibration material layer 27-1 may have a shape substantially the same as the shape of the of the upper electrode 27-2 disposed therebelow, e.g., a circular structure, the lower electrode 27-2 also may have a circular structure, and the lower electrode 27-2 is connected to the electrode pad 27-21 along at least a portion of the side of the vibration material layer 27-1.

In an exemplary embodiment, as described above, the two electrodes 27-2 may be disposed on and beneath the acoustic element 27, but not being limited thereto. In an alternative exemplary embodiment of the invention, one of the two electrodes may be omitted and another structure may be provided instead.

Figure 9:
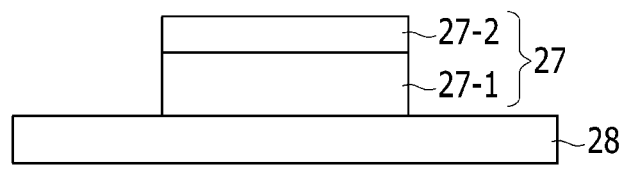

Referring to FIG. 9, in an alternative exemplary embodiment, the acoustic element 27 may include an upper electrode 27-2 and the vibration material layer 27-1 disposed under the upper electrode 27-2. In such an embodiment, the rear chassis 28 including a conductive material is disposed beneath the vibration material layer 27-1. In such an embodiment, the rear chassis 28 and the upper electrode 27-2 function as a pair of electrodes to apply the electric field to the vibration material layer 27-1. In an exemplary embodiment, as shown in FIG. 9, where components, between which the acoustic element 27 disposed and bonded, includes a conductive material, one of the two electrodes described above may be omitted, and a corresponding component including a conductive material (e.g., the rear chassis 28 in FIG. 9) may function as an electrode. In such an embodiment, the components functions as the electrode such as the rear chassis 28 may not be applied with other electrical signals, other than the signal from the amplifier.

According to an exemplary embodiment, as shown in FIG. 9, the rear chassis 28 functions as the lower electrode is substantially wider than the acoustic element 27, and a large number of connection positions of electric wires may be defined on the rear chassis 28. Therefore, in such an embodiment, the upper electrode pad 27-21 disposed along the side of the vibration material layer 27-1 as shown in FIGS. 7 and 8 may be omitted.

Hereinafter, an exemplary embodiment of an acoustic element 27 having a multi-layer structure will be described with reference to FIG. 10.

Figure 10:
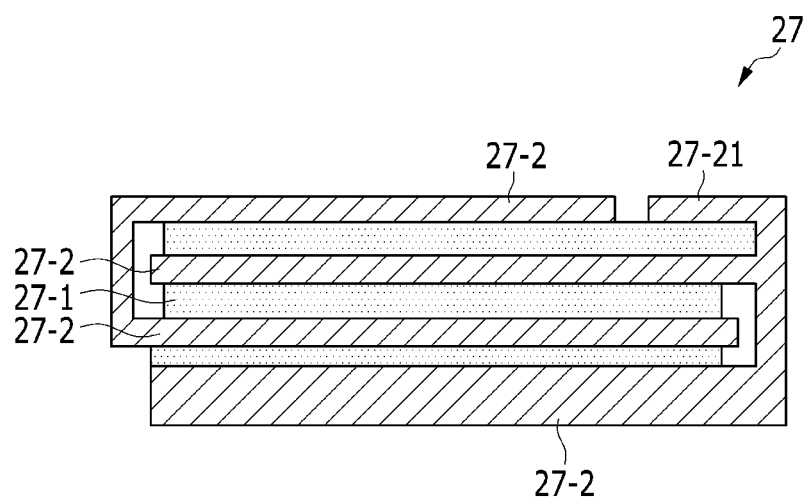

In an exemplary embodiment, as shown in FIG. 10, the acoustic element 27 includes three vibration material layers 27-1 and four electrodes 27-2. The vibration material layers 27-1 are arranged opposite to each other, e.g., in a triple-layer structure, and the four electrodes 27-2 are disposed at the outermost side of the vibration material layer 27-1 and between the three layers of the vibration material layer 27-1. Two of the four electrodes each may be electrically connected to each other, and may be alternately disposed with each other. A bottom electrode 27-2 and a top electrode 27-2 are applied with different signals and an intermediate electrode 27-2 is connected to the top electrode 27-2 or the bottom electrode 27-2 along the side of the vibration material layer 27-1. A portion of the bottom electrode 27-2 disposing at the side of the top electrode 27-2 defines the electrode pad 27-21 such that a wiring may be connected to the electrode pad 27-21. In such an embodiment, each vibration material layer 27-1 vibrates by the electric field generated by the electrodes 27-2 vertically contacting each vibration material layer 27-1 and which receives different signals, thereby generating a sound. An exemplary embodiment, of the acoustic element 27 including three vibration material layers 27-1 may generate a higher sound pressure than an acoustic element including a single acoustic element 27.

Hereinafter, an exemplary embodiment of the amplifier 80 that provides the signal to the acoustic element 27 will be described with reference to FIGS. 11 and 12.

Figure 11:
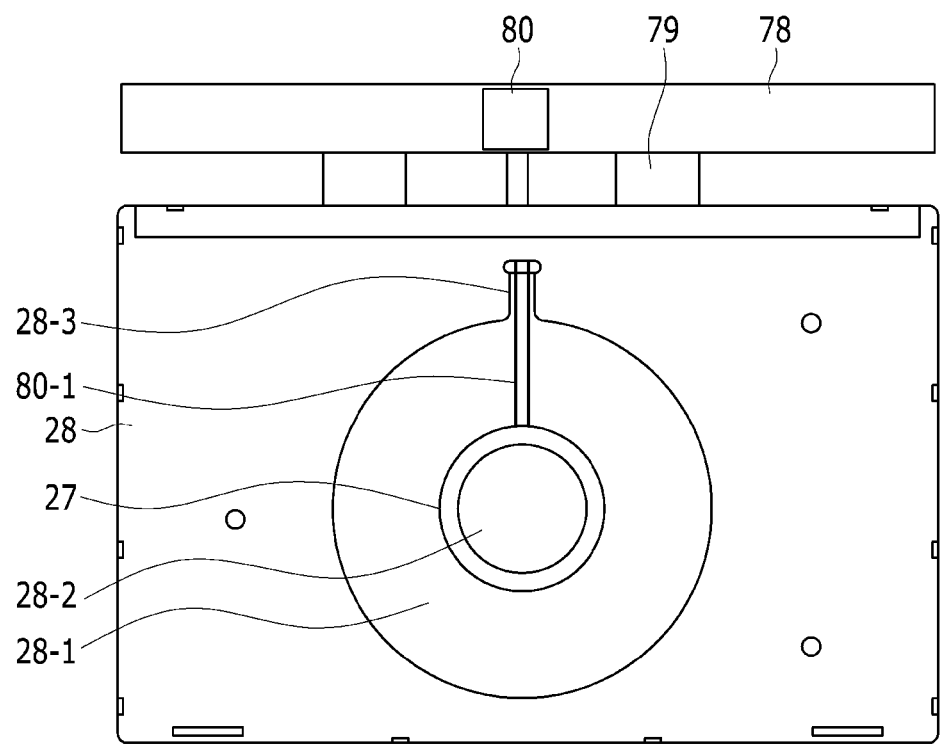
FIGS. 11 and 12 are diagrams illustrating an exemplary embodiment of an amplifier in the display device according to the invention.
Figure 12:
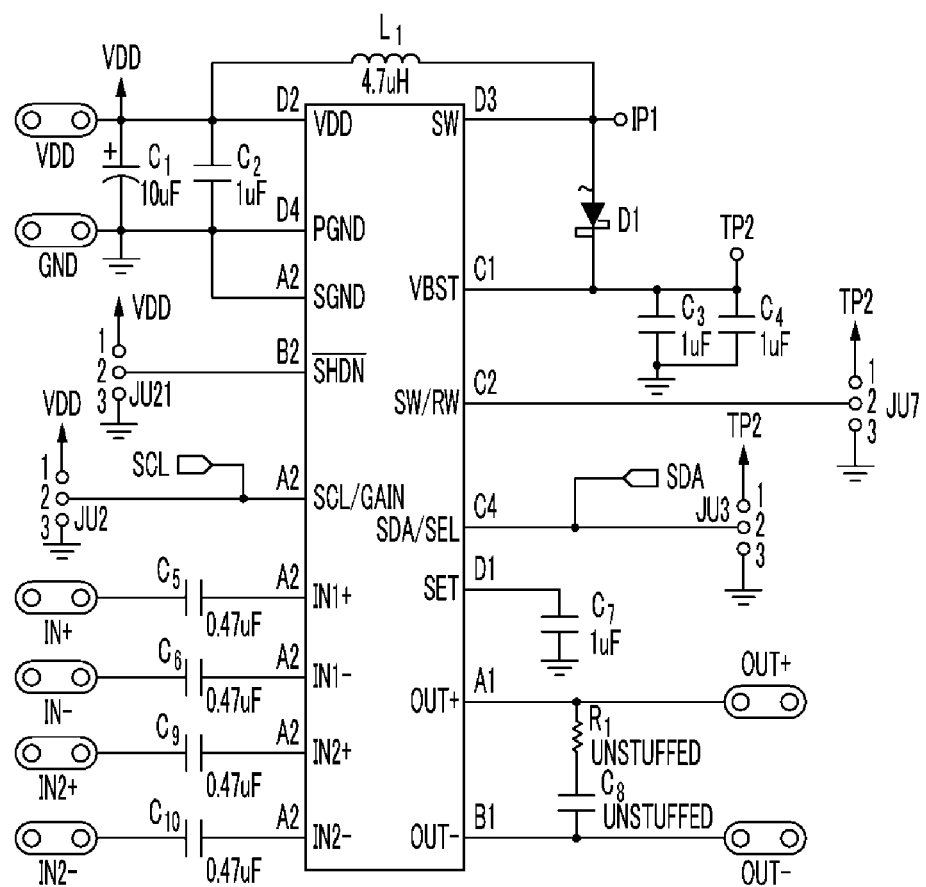

FIGS. 11 and 12 are diagrams illustrating an exemplary embodiment of an amplifier in the display device according to the invention.

In an exemplary embodiment of the display device 100 according to the invention, the amplifier 80 is disposed on a printed circuit board ("PCB") 78. In such an embodiment, the amplifier 80 may be disposed within a signal controller (not illustrated) which controls an image display of the display device 100 or may be provided separately from the signal controller. FIGS. 11 and 12 illustrate an exemplary embodiment in which the amplifier 80 is separately provided.

A signal output from the amplifier 80 is transferred to the display panel 70 along the flexible circuit board 79, and the signal is applied to the acoustic element 27 through the acoustic signal line 80-1 which is disposed in the display panel 70.

The amplifier 80 receives and amplifies the acoustic signal transferred from the outside, and transfers the amplified acoustic signal to the acoustic element 27 through an acoustic signal line 80-1.

The amplifier 80 may include various ICs, as illustrated in FIG. 12.

In an exemplary embodiment, the amplifier 80 includes a single IC chip and further includes a coil $L_1$, a plurality of capacitors $C_1$ to $C_{10}$, and a resistor $R_1$ disposed therearound. Referring to the structure illustrated in FIG. 12, the single IC chip has a total of 16 input and output terminals. The input and output terminals includes a power voltage input terminal VDD, two ground voltage input terminals PGND and SGND connected to a ground GND, two constant voltage input terminals SW and VBST, four input signal terminals IN1+, IN1−, IN2+ and IN2−, two output signal terminals OUT+ and OUT−, a timing input terminal SET and four selection signal input terminals SHDN, SCL/GAIN, SW/RW and SDA/SEL. The four input signals are amplified and converted based on the signal selected by the four selection signal input terminals, and then are applied to the two output terminals.

In an exemplary embodiment, where the display device 100 is included in the portable terminal carried by a user, the acoustic signal applied to the amplifier 80 may be applied from the outside of the display device and the acoustic signal may be applied from a control unit, e.g., a microprocessor unit ("MPU") of the portable terminal to the amplifier 80.

Hereinafter, exemplary embodiments of a method of using of the display device 100 including the acoustic element other than a method of providing a sound to a user will now be described.

FIGS. 13 to 17 are diagrams illustrating operation characteristics of an exemplary embodiment of the display device according to the invention.

Figure 13:
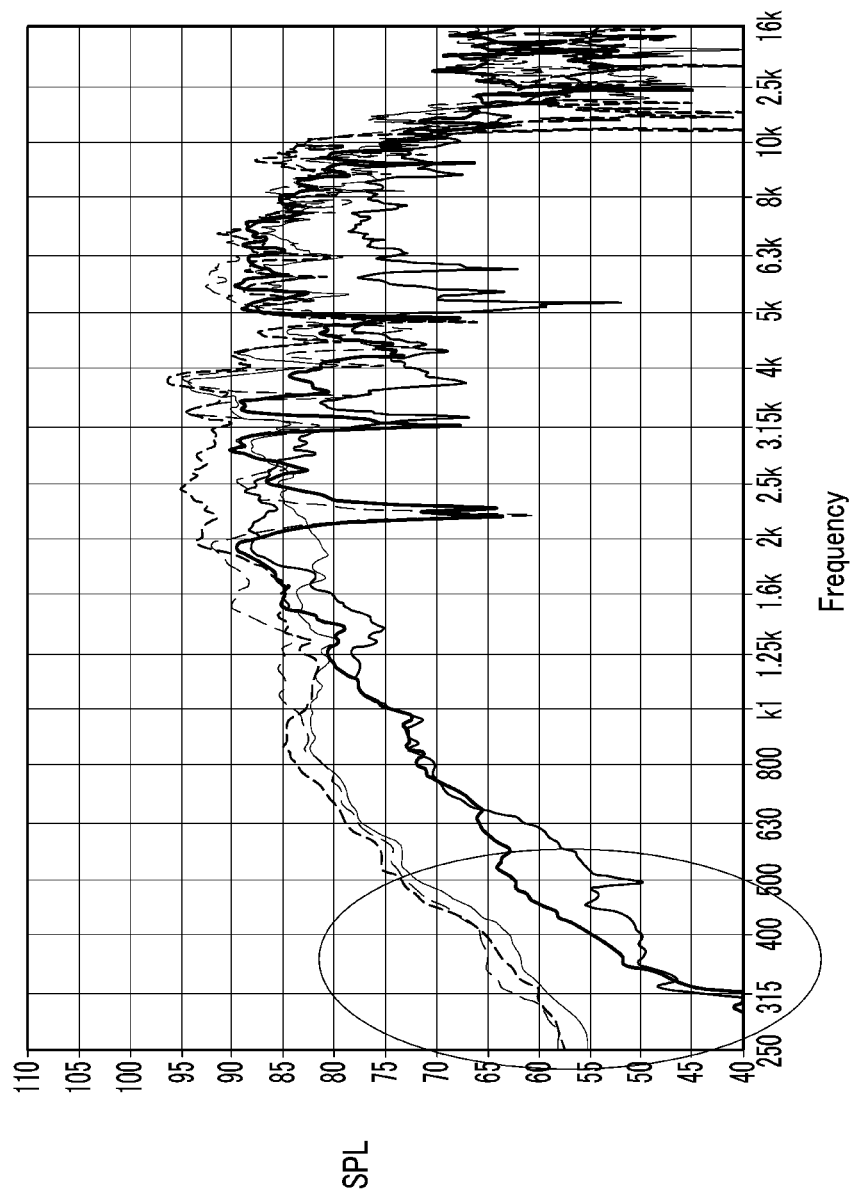
FIGS. 13 to 17 are diagrams illustrating operation characteristics of an exemplary embodiment of the display device according to the invention.

First, FIG. 13 shows a graph of sound pressure level ("SPL") versus frequency of the vibration of the acoustic element 27, showing a frequency range that may be used for a haptic function.

In an exemplary embodiment, the display device 100 may vibrate by the acoustic element 27. In such an embodiment, the display device 100 may generate low frequency vibrations corresponding to a frequency lower than an audible frequency (e.g., a sound pressure at a frequency lower than the audible frequency) as illustrated in FIG. 13. In such an embodiment, the low frequency vibration may not be heard by a user, such that the low frequency vibration does not affect a sound quality and the low frequency vibration may be used for other operations. In one exemplary embodiment, for example, a touch of a user may be sensed by sensing a vibration generated when the user touches the display device 100. In such an embodiment, the display device 100 may sense whether the touch occurs or not, and may have the haptic function based on a low frequency vibration. In such an embodiment, the haptic function may be performed by sensing the touch of the user using low frequency vibration using the acoustic element 27. In such an embodiment, the display device may further include a sensor which may sense low-frequency vibrations, lower than the audible frequency, and the haptic function using the sensor may be performed by the signal controller provided for displaying the image in the display device 100 or by the control unit (e.g., MPU) of the portable terminal in the portable terminal.

Hereinafter, an exemplary embodiment of a pressure sensing sensor will be described with reference to FIG. 14.

The vibration material layer 27-1 included in the acoustic element 27 vibrates by the electric field to generate a sound. When the vibration material layer 27-1 vibrates without being applied with the electric field, the voltage is generated from the vibration material layer 27-1. Accordingly, in an exemplary embodiment, by sensing an occurrence of a displacement of the vibration material layer 27-1 based on a voltage generated in the vibration material layer 27-1, the display device 100 may sense a pressure thereon when the vibration material layer 27-1 is pressed by a pressure.

In an exemplary embodiment, where the display device 100 may sense the pressure using the acoustic element 27, a sensor 85 that senses the voltage generated from the acoustic element 27 may be additionally provided in the display device 100. In an alternative exemplary embodiment, an amplifier 80 having a modified structure may function as the pressure sensor. In such an embodiment, the modified amplifier may function as the amplifier 80 and as the sensor 85 in a time divisional manner.

Figure 15:
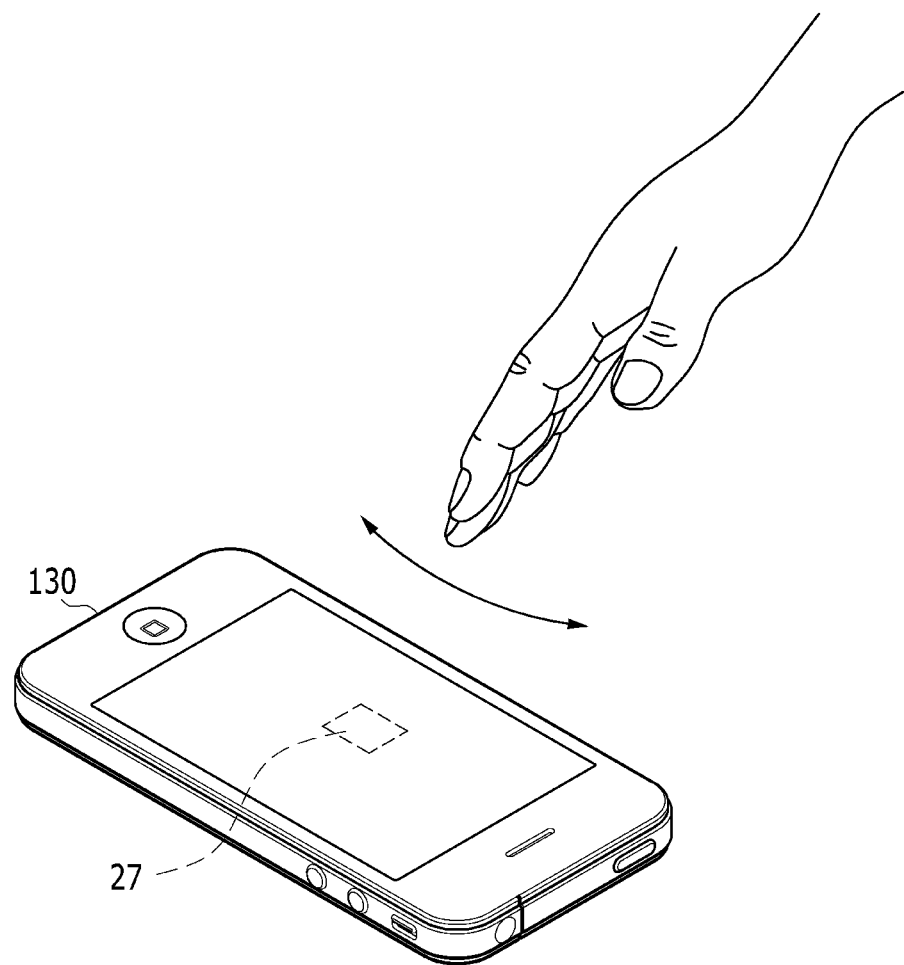

FIG. 15 illustrates an exemplary embodiment of a method of sensing a hand motion of a user using a Doppler effect.

Figure 16:
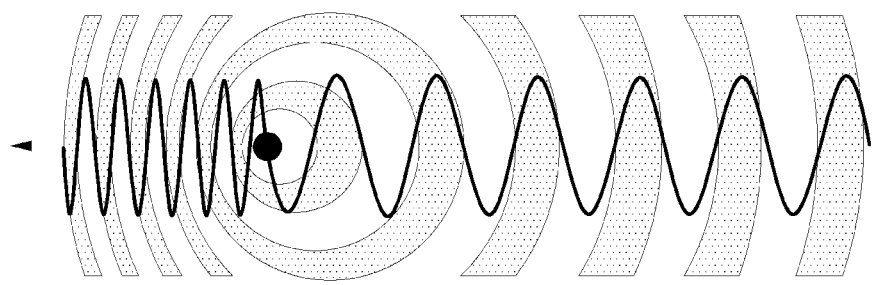

In an exemplary embodiment, where the display device 100 is included in a portable terminal, when the acoustic element 27 disposed within the display device 100 generates a high-frequency or low-frequency sound wave, outside an audible frequency range, and when the user moves his/her hand on the front surface of the display device 100, the generated sound wave is changed by the motion of the hand, and then the changed sound wave is input to a microphone 130 of the portable terminal. As illustrated in FIG. 16, the sound pressure of the sound wave may be transferred to the mike 130 while being strengthened or weakened due to the Doppler effect by the hand motion of the user, and the hand motion of the user may be sensed by sensing the change in the sound wave input to the microphone 130.

In an exemplary embodiment, where the display device 100 including the acoustic element 27 is used in a device including a microphone 130, e.g., a portable terminal shown in FIG. 15, the motion sensing may be performed without using a separately provided component.

An exemplary embodiment of a method of motion sensing illustrated in FIG. 15 does not use the image processing using a camera such that the method of motion sensing is substantially simplified.

Figure 17:
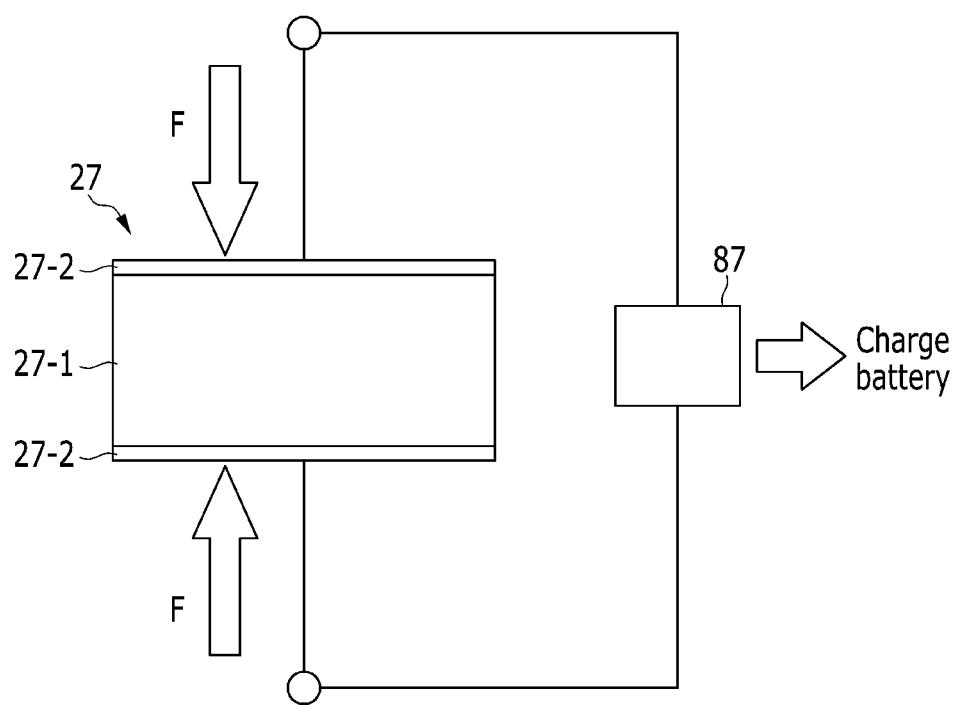

Hereinafter, an exemplary embodiment of a method of charging a battery of the portable terminal including the display device including the acoustic element 27 will be described with reference to FIG. 17.

Figure 14:
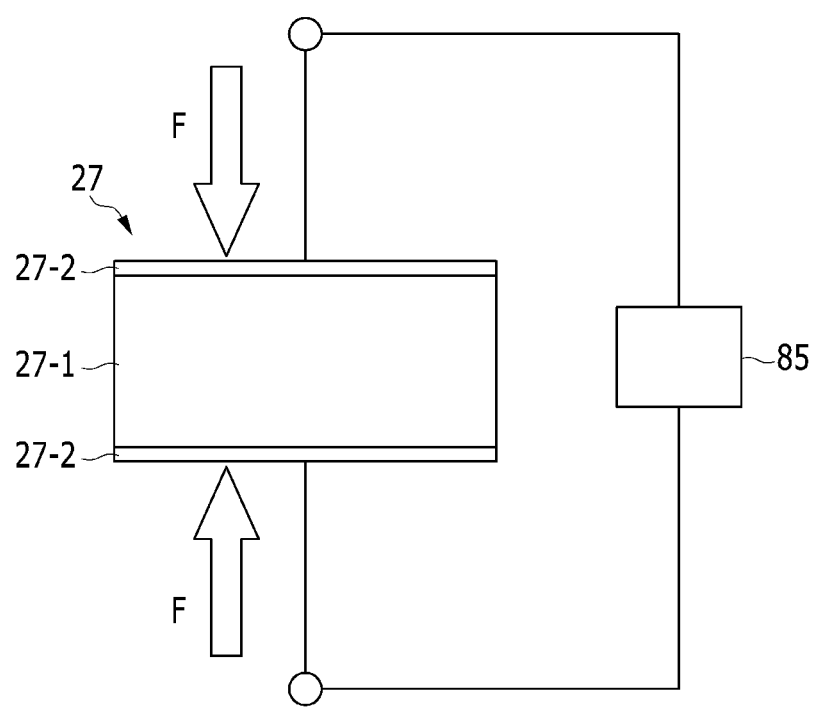

As described in FIG. 14, when the vibration material layer 27-1 included in the acoustic element 27 vibrates without being applied with the electric field, the voltage is generated from the vibration material layer 27-1. In an exemplary embodiment, the generated voltage may be stored in a capacitor or a battery 87 such that the use time of the battery may be increased. In general, the portable terminal move when the portable terminal is carried by a user, the portable terminal is typically exposed to a certain level of vibration. Therefore, in an exemplary embodiment of the portable terminal including the acoustic element 27, the acoustic element 27 vibrates when the portable terminal is carried by a user such that a voltage is generated and then may be transferred to the battery 87, thereby charging the battery 87.

In such an embodiment, when the user swings the portable terminal including the acoustic element 27 or touches the portable terminal with a finger, the battery 87 may be charged.

The exemplary embodiments illustrated in FIGS. 13 to 17 may be performed based on the time division driving using the single acoustic element 27 while the acoustic element provides a sound. In such embodiments, an additional acoustic element may be provided. In such an embodiment, the additional acoustic element 27 may not be connected to the amplifier, but connected to a separate sensor or a battery such that the additional acoustic element 27 may perform only the sensing operation or the battery charging operation.

In an alternative exemplary embodiment, the acoustic element 27 may be disposed outside the display device 100, e.g., in any portion of the portable terminal including the display device 100 to allow the acoustic element 27 to performs the functions described with reference to FIGS. 13 to 17.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display device, comprising:
a display panel which displays an image;
a rear chassis which covers a rear surface of the display panel, wherein the rear chassis comprises:

a first protruding region which protrudes to a rear surface of the chassis; and a second protruding region which is disposed in the first protruding region and further protrudes from the first protruding region to the rear surface of the chassis; and an acoustic element disposed in the first protruding region and at a space defined in the second protruding region, wherein the acoustic element comprises a plurality of electrodes, and a vibration material layer disposed between the electrodes.

2. The display device of claim 1, wherein
the acoustic element covers the second protruding region.

3. The display device of claim 2, further comprises:
an adhesive disposed along a boundary between the first protruding region and the second protruding region,
wherein the adhesive fixes the acoustic element in a predetermined position corresponding to the first protruding region and the second protruding region.

4. The display device of claim 3, wherein
the acoustic element is bonded to the rear surface of the display panel by the adhesive, and
the adhesive comprises a non-conductive epoxy.

5. The display device of claim 3, further comprising:
an additional acoustic element disposed inside the space defined in the second protruding region.

6. The display device of claim 5, wherein
the adhesive is disposed between the additional acoustic element and an inner surface of the second protruding region along an edge portion of a rear surface of the additional acoustic element, and
the additional acoustic element is spaced apart from the inner surface of the second protruding region.

7. The display device of claim 2, wherein
each of the first protruding region and the second protruding region comprises a plurality of portions, and
the portions of the first protruding region and the portions of the second protruding region are in a one-to-one correspondence with each other.

8. The display device of claim 7, wherein
each of the first protruding region and the second protruding region comprises two portions,
the acoustic element is disposed in one of the two portions of the first protruding region and at a space defined in one of the two portions of the second protruding region corresponding to the one of the two portions of the first protruding region,
the display device further comprises an additional acoustic element disposed in the other of the two portions of the first protruding region and at a space defined in the other of the two portions of the second protruding region corresponding to the other of the two portions of the first protruding region.

9. The display device of claim 2, further comprising:
a wiring connection part defined in the rear chassis; and
an acoustic signal line disposed in the wiring connection part and connected to the acoustic element.

10. The display device of claim 2, wherein
the acoustic element further comprises an electrode pad which extends to an upper portion of the vibration material layer through a side of the vibration material layer from an electrode disposed under the vibration material layer.

11. The display device of claim 2, wherein
the acoustic element comprises three vibration material layers, and four electrodes,
the three vibration material layers are disposed opposite to each other, and
the four electrodes are disposed at an outermost side of the three vibration material layers and between the three vibration material layers, respectively.

12. The display device of claim 11, wherein
the acoustic element further comprises an electrode pad which extends from an electrode disposed at a bottom portion of the vibration material layers among the four electrodes to an upper portion of the vibration material layers through a side of the vibration material layers.

13. The display device of claim 12, wherein
two of the four electrodes are electrically connected to each other and are alternately disposed with each other.

14. The display device of claim 2, further comprising:
an amplifier which amplifies an acoustic signal applied from an outside; and
an acoustic signal line which transfers the acoustic signal from the amplifier to the acoustic element.

15. The display device of claim 14, wherein:
the display panel comprises a substrate, a printed circuit board, and a flexible circuit board,
wherein
the substrate of the display panel is connected to the printed circuit board through the flexible circuit board, and
the amplifier is disposed on the printed circuit board.

16. The display device of claim 1, wherein
the vibration material layer of the acoustic element vibrates at a frequency outside an audible frequency range, and
a haptic function of the display device senses a change in the frequency of a vibration of the acoustic element based on a touch of a user.

17. The display device of claim 1, wherein
the acoustic element senses a pressure thereon using a voltage generated therein by the pressure.

18. The display device of claim 1, wherein
the display device further comprises a microphone,
the acoustic element vibrates at a frequency outside an audible frequency range to emit a sound pressure, and
the microphone senses an operation of a user by sensing a change in the sound pressure by the operation of the user based on a Doppler effect.

19. The display device of claim 1, further comprising:
a battery which supplies power to the display device,
wherein the acoustic element generates a voltage when the acoustic element is vibrated, and
the acoustic element transfers the generated voltage to the battery to charge the battery.

* * * * *